United States Patent
Nguyen et al.

(10) Patent No.: US 12,473,028 B2
(45) Date of Patent: Nov. 18, 2025

(54) VEHICLE CHASSIS CROSSMEMBER APPARATUSES AND METHODS THEREOF

(71) Applicant: DAIMLER TRUCK NORTH AMERICA LLC, Portland, OR (US)

(72) Inventors: Victor Nguyen, Portland, OR (US); Mahesh Sridhar, Bangalore (IN); Bryan Morriss, Portland, OR (US); Reto Haggenmueller, Portland, OR (US)

(73) Assignee: DAIMLER TRUCK NORTH AMERICA LLC, Portland, OR (US)

( * ) Notice: Subject to any disclaimer, the term of this patent is extended or adjusted under 35 U.S.C. 154(b) by 0 days.

(21) Appl. No.: 18/841,999

(22) PCT Filed: Mar. 1, 2023

(86) PCT No.: PCT/US2023/014230
§ 371 (c)(1),
(2) Date: Aug. 27, 2024

(87) PCT Pub. No.: WO2023/167896
PCT Pub. Date: Sep. 7, 2023

(65) Prior Publication Data
US 2025/0178670 A1 Jun. 5, 2025

Related U.S. Application Data

(60) Provisional application No. 63/315,193, filed on Mar. 1, 2022.

(51) Int. Cl.
*B62D 21/02* (2006.01)
*B62D 21/12* (2006.01)

(52) U.S. Cl.
CPC ............. *B62D 21/02* (2013.01); *B62D 21/12* (2013.01)

(58) Field of Classification Search
CPC ......... B62D 21/02; B62D 21/06; B62D 21/08
See application file for complete search history.

(56) References Cited

U.S. PATENT DOCUMENTS 2,052,535 A * 8/1936 Sherman ................ B62D 21/06
280/800
2,113,540 A * 4/1938 Maddock ............... B62D 21/06
280/797

(Continued)

FOREIGN PATENT DOCUMENTS

| CN | 113428229 A | * | 9/2021 |
| CN | 215928615 U | | 1/2022 |
| KR | 101736622 B1 | * | 5/2017 |

OTHER PUBLICATIONS

Jae Hyun Kim, Frame for Vehicle, May 17, 2017, EPO, KR 10-1736622 B1, Machine Translation of Description (Year: 2017).*

(Continued)

*Primary Examiner* — James A English
(74) *Attorney, Agent, or Firm* — ArentFox Schiff LLP

(57) ABSTRACT

The disclosed technology relates to vehicle chassis components, including adapter plate apparatuses and vehicle chassis crossmember apparatuses. With this technology, a vehicle chassis crossmember apparatuses can be introduced between chassis rails and secured using an adapter plate apparatus, without requiring disassembly and separation of the vehicle chassis rails. Thus, with this technology, replacement of a failed crossmember can be performed more efficiently, with reduced labor, in a reduced amount of time, and with minimal reassembly of other vehicle components, while maintaining sufficient structural support, among other advantages.

24 Claims, 5 Drawing Sheets

(56) References Cited

U.S. PATENT DOCUMENTS

| | | | | |
|---|---|---|---|---|
| 2,118,257 | A | * | 5/1938 | Maddock .............. B62D 21/06 280/794 |
| 2,154,154 | A | | 4/1939 | Eklund |
| 2,155,750 | A | * | 4/1939 | Best ..................... B62D 21/06 180/291 |
| 2,257,664 | A | * | 9/1941 | Almdale ............... B62D 21/06 280/794 |
| 2,609,217 | A | * | 9/1952 | Hess ..................... B62D 21/06 280/794 |
| 5,634,663 | A | | 6/1997 | Krupp et al. |
| 2014/0049033 | A1 | * | 2/2014 | Yee ..................... B62D 27/065 280/797 |
| 2020/0231212 | A1 | | 7/2020 | Kim |

OTHER PUBLICATIONS

Guangfeng Zhu, Van trailer connecting piece, Sep. 24, 2021, EPO, CN 113428229 A, Machine Translation of Description (Year: 2021).*
Zhang et al., Mounting seat applied to support combination, Mar. 1, 2022, EPO, CN 215928615 U, Machine Translation of Description (Year: 2022).*
International Search Report for PCT/US2023/014230, dated May 19, 2023.
Written Opinion for PCT/US2023/014230, dated May 19, 2023.

* cited by examiner

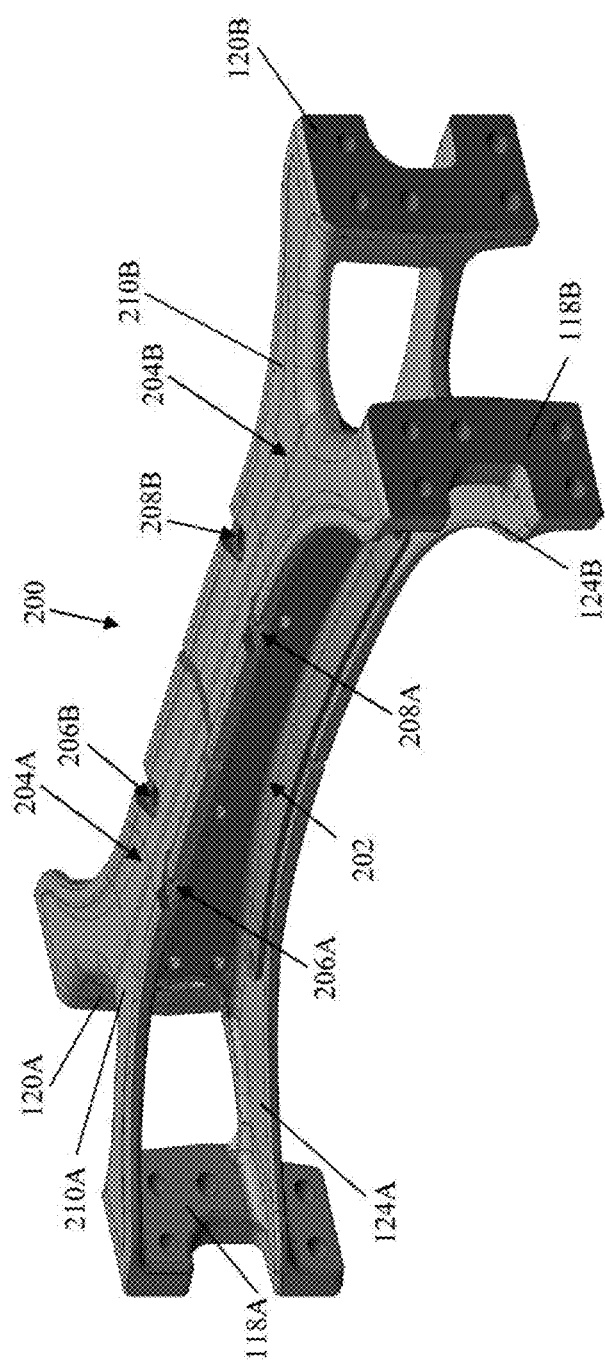
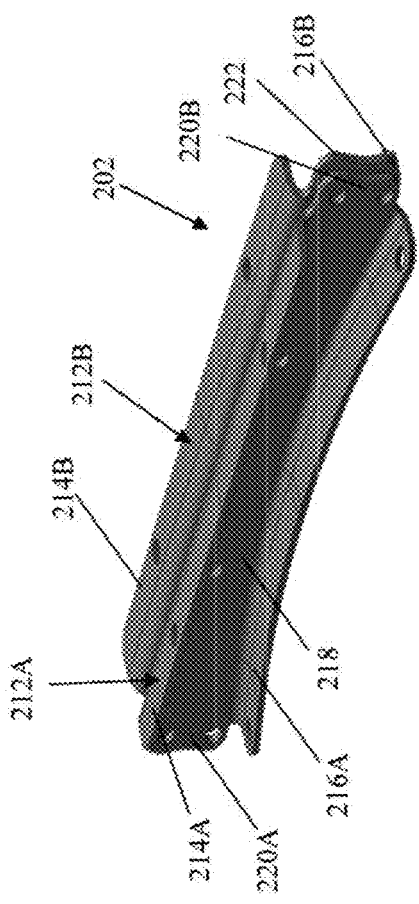
FIG. 2A
FIG. 2B

VEHICLE CHASSIS CROSSMEMBER APPARATUSES AND METHODS THEREOF

This patent application is a U.S. national stage filing under 35 U.S.C. § 371 of International PCT Application No. PCT/US23/14230, filed Mar. 1, 2023, which claims priority to U.S. Provisional Patent Application No. 63/315,193, filed Mar. 1, 2022, each of which is incorporated by reference herein in its entirety.

FIELD

This technology generally relates to vehicle structural components and, more particularly, to vehicle chassis crossmember apparatuses and methods of making, installing, and using the same.

BACKGROUND

Current vehicle chassis include crossmembers mounted to and between opposing rails to help support vehicle load, maintain alignment, and facilitate proper operation of suspension systems. Chassis rails include upper and lower flanges to support vehicle components that may be mounted thereto. The crossmembers and other vehicle components are mounted to opposing interior planar surfaces of the chassis rails, and between the upper and lower flanges, during vehicle assembly. Current crossmembers may be made of relatively light-weight aluminum and cast as unitary components.

Subsequent to vehicle assembly, the crossmembers can fail (e.g., crack or break), such as due to vehicle overloading. However, a new replacement crossmember cannot be introduced between the chassis rails from an upper or lower direction because the upper and lower flanges of the chassis rails prevent such access. Additionally, the replacement crossmember cannot be introduced from a direction parallel to the length of the chassis rails because many other vehicle components are mounted to the interior planar surfaces of the chassis rails that prevent sliding the replacement crossmember into place.

Accordingly, while the failed crossmember can be cut and unbolted for removal, installation of a new crossmember is currently a labor-intensive process that requires disassembly and separation of the chassis rails to yield sufficient space for insertion of the replacement crossmember. In addition to being time-consuming and inefficient, the disassembly required by the current crossmember replacement process can create downstream issues if each vehicle component disassembled to allow separation of the chassis rails is not properly reassembled and secured subsequent to installation of the new crossmember.

SUMMARY

In one example, an adapter plate apparatus is disclosed that includes an upper adapter plate component including a first substantially planar exterior surface, a first substantially convex interior surface, and a first set of holes. The adapter plate apparatus further includes a lower adapter plate component including a second substantially planar exterior surface, a first substantially convex interior surface, and a second set of holes. In this example, each hole of the first set of holes is located so as to be aligned with one of the second set of holes when the upper and lower adapter plate components are received by first and second crossmember components of a vehicle chassis crossmember apparatus, respectively.

In another example, a vehicle chassis crossmember apparatus is disclosed that includes a first crossmember component including a first planar portion, a first upper crossmember component, a first lower crossmember component coupled to the first upper crossmember component via the first planar portion, and a first exterior recess. The vehicle chassis crossmember apparatus also includes a second crossmember component including a second planar portion, a second upper crossmember component, a second lower crossmember component coupled to the second upper crossmember component via the second planar portion, and a second exterior recess. In this example, the vehicle chassis crossmember apparatus further includes an upper adapter plate component and a lower adapter plate component configured to be received by and coupled to the first and second exterior recesses, to thereby couple the first crossmember component to the second crossmember component.

In yet another example, a method for installing a vehicle chassis crossmember is disclosed that includes coupling a first set of attachment plates of a first crossmember component of a vehicle chassis crossmember apparatus to a first chassis rail between first upper and lower flanges of the first chassis rail. A second set of attachment plates of a second crossmember component of the vehicle chassis crossmember apparatus is then coupled to a second chassis rail between second upper and lower flanges of the second chassis rail. An upper adapter plate component of the vehicle chassis crossmember apparatus is also coupled to first and second upper exterior recesses of the first and second crossmember components. Additionally, a lower adapter plate component of the vehicle chassis crossmember apparatus is coupled to first and second lower exterior recesses of the first and second crossmember components in this example.

The vehicle chassis crossmember components described and illustrated by way of the examples herein can advantageously be introduced between chassis rail interior planar surfaces, and upper and lower flanges, for example, and secured using an adapter plate apparatus, without requiring disassembly and separation of the vehicle chassis rails. Accordingly, replacement of a failed crossmember can be performed more efficiently, with reduced labor, in a reduced amount of time, and with minimal reassembly of other vehicle components, while maintaining sufficient structural support.

BRIEF DESCRIPTION OF THE DRAWINGS

FIGS. 2A-B illustrate an exemplary second crossmember apparatus that employs an exemplary second adapter plate apparatus;

DETAILED DESCRIPTION

The crossmember apparatuses described and illustrated by way of the examples herein include separate crossmember components coupled together via adapter plate apparatuses. The crossmember components can be introduced between chassis rail interior planar surfaces, and upper and lower flanges, to replace a failed crossmember, and secured using an adapter plate apparatus, various examples of which are described and illustrated in detail below, without requiring disassembly and separation of the chassis rails. Accordingly, with the technology disclosed herein, replacement of a failed crossmember can advantageously be performed more efficiently, with reduced labor, in a reduced amount of time, and while minimizing reassembly of other vehicle components and maintaining sufficient structural support.

Figure 1A:
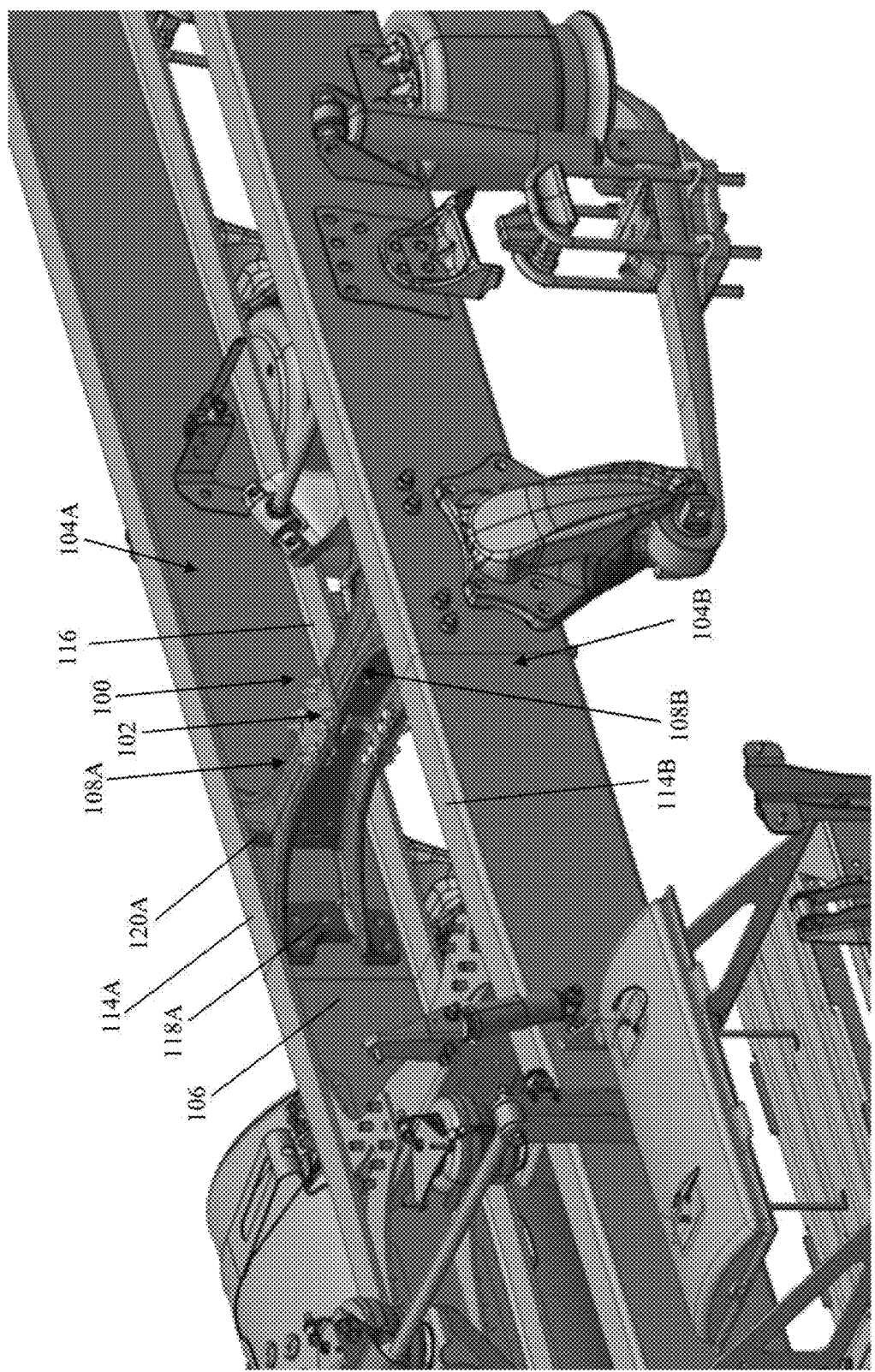
FIGS. 1A-C illustrate an exemplary first crossmember apparatus that employs an exemplary first adapter plate apparatus.
Figure 1B:
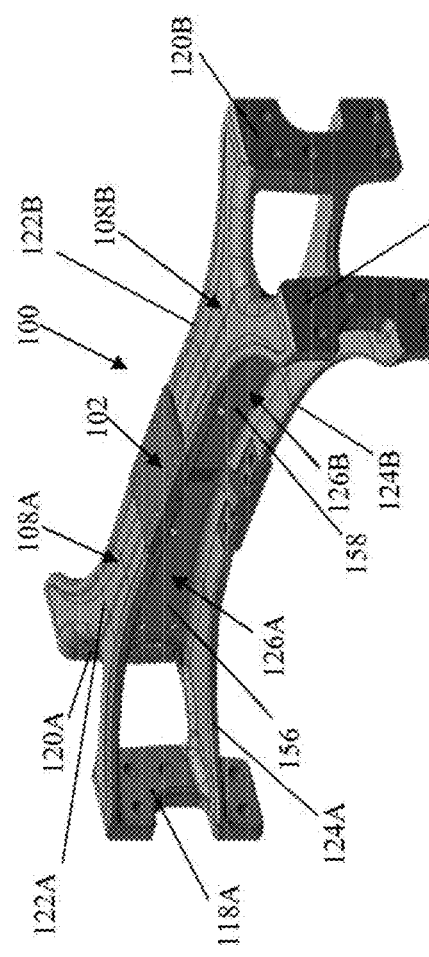
Figure 1C:
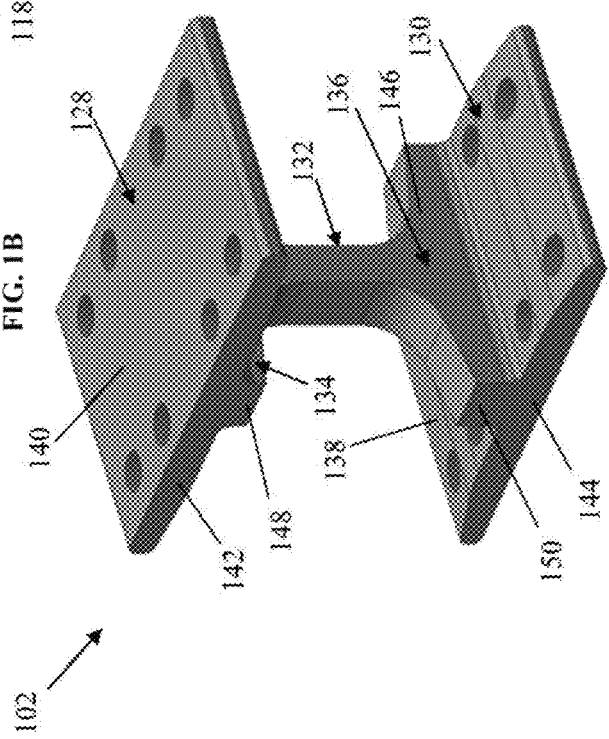

Referring to FIGS. 1A-C, an exemplary first crossmember apparatus 100 that employs a first adapter plate apparatus 102 according to some examples of this technology is illustrated. Referring more specifically to FIG. 1A, opposing first and second chassis rails 104A-B include a first interior planar surface 106 disposed opposite a second interior planar surface (not shown), respectively, to which the first crossmember apparatus 100 is mounted. Specifically, a first crossmember component 108A of the first crossmember apparatus 100 is bolted to the first interior planar surface 106 of the first chassis rail 104A and a second crossmember component 108B is bolted to the interior planar surface of the second chassis rail 104B.

Additionally, the first crossmember component 108A is bolted to the first interior planar surface 106 between a first upper flange 114A and a first lower flange 116 of the first chassis rail 104A and the second crossmember component 108B is bolted to the second interior planar surface between a second upper flange 114B and a second lower flange (not shown) of the second chassis rail 104B. The first crossmember component 108A includes integral first and second attachment plates 118A and 120A, respectively, which are spaced apart and separately bolted to the first interior planar surface 106. Similarly, the second crossmember component 108B includes integral first and second attachment plates 118B and 120B, respectively, which are spaced apart and separately bolted to the second interior planar surface of the second chassis rail 104B.

Referring more specifically to FIG. 1B, the first crossmember component 108A also includes integral first upper and lower crossmember components 122A and 124A, respectively, that split toward the first and second attachment plates 118A and 120A, respectively. The first upper and lower crossmember components 122A and 124A, respectively, also extend further in both directions parallel to the length of the first and second chassis rails 104A-B than a first planar portion 126A to create an overhang and, with the first planar portion 126A, define recessed areas on both front and rear sides. Similarly, the second crossmember component 108B also includes integral second upper and lower crossmember components 122B and 124B, respectively, that split toward the first and second attachment plates 118B and 120B, respectively, and extend further in both directions parallel to the length of the first and second chassis rails 104A-B than a second planar portion 126B to create another overhang and, with the second planar portion 126B, define additional recessed areas on front and rear sides.

Accordingly, the first and second chassis rails 104A-B, and the first and second crossmember components 108A-B, are mirror images of each other in this particular example, although other configurations could also be used. The first and second crossmember components 108A-B are coupled together via the first adapter plate apparatus 102 in the examples of this technology illustrated in FIGS. 1A-C. In particular, the first adapter plate apparatus 102 is configured to be received by, and bolted to, machined exterior recesses in the first and second upper crossmember components 122A-B and first and second lower crossmember components 124A-B, with the bolts extending through the first and second upper crossmember components 122A-B and first and second lower crossmember components 124A-B and attached via nuts within opposing interior recesses in the first and second upper crossmember components 122A-B and first and second lower crossmember components 124A-B. The interior and exterior recesses will be described and illustrated in more detail later with reference to FIG. 4.

Referring more specifically to FIG. 1C, the first adapter plate apparatus 102 includes an integral upper adapter plate component 128 and an integral lower adapter plate component 130 coupled together via an integral bridge component 132. The bridge component 132 includes an integral upper bridge component 134 and an integral lower bridge component 136, which interface with the upper adapter plate component 128 and lower adapter plate component 130, respectively. The upper bridge component 134 and lower bridge component 136 are mirror images of each other in this example, as are the upper adapter plate component 128 and the lower adapter plate component 130, although other configurations can also be used in other examples.

The interior surface (not shown) of the upper adapter plate component 128 and the opposing interior surface 138 of the lower adapter plate component 130 are curved such that the upper and lower adapter plate components 128 and 130, respectively, have decreasing thickness in a direction from the upper and lower bridge components 134 and 136, respectively, toward the first and second crossmember components 108A-B, when the first adapter plate apparatus 102 and first and second crossmember components 108A-B are coupled together. The machined exterior recesses in the first and second upper crossmember components 122A-B and first and second lower crossmember components 124A-B, which are described and illustrated in more detail below with reference to FIG. 4, substantially correspond to the curved shape of the interior surface of the upper adapter plate component 128 and the opposing interior surface 138. The curved shape provides a relatively smooth stress transfer between the first adapter plate apparatus 102 and the first and second crossmember components 108A-B.

The exterior surface 140, rear surface 142, and front surface (not shown) of the upper adapter plate component 128, the exterior surface (not shown), rear surface 144, and front surface (not shown) of the lower adapter plate component 130, the first side surface 146 and the second side surface (not shown) of the bridge component 132, the rear surface 148 and front surface (not shown) of the upper bridge component 134, and the rear surface 150 and front surface (not shown) of the lower bridge component 136 are planar in this particular example, although one or more of these surfaces could have a different shape and/or surface contour in other examples. Additionally, the upper bridge component 134 and the lower bridge component 136 each have a bolt pattern that includes four sets of two offset holes for receiving bolts (e.g., M12 flange bolts). The offset hole pattern advantageously distributes stress to improve durability, although other hole patterns can also be used.

While an exemplary length, in the transverse direction with respect to a long axis of the first and second chassis rails 104A-B, of the upper adapter plate component 128 and lower adapter plate component 130 is illustrated in FIG. 1, the lengths of either adapter plate component can differ in other examples, and shorter or longer adapter plate component(s) can also be used, with a resulting corresponding impact on weight and ride or suspension stiffness (e.g., a longer adapter plate component may increase ride stiffness), for example. In some examples, the surface contour of the rear surface 152 and/or front surface 154 of the bridge component 132 can correspond with, and define a continuance of, the surface contour of the rear sides 156 and 158 and the front sides (not shown), respectively, of the first and second planar portions 126A-B, although other surface contours and shapes for the bridge component 132 can also be used. In some examples, the bridge component 132 is at least as wide, in a direction parallel to the first and second chassis rails 104A-B, as the first and second planar portions 126A-B at the intersection of the upper and lower bridge components 134 and 136, respectively.

Referring to FIGS. 2A-B, an exemplary second crossmember apparatus 200 that employs a second adapter plate apparatus 202 according to some examples of this technology is illustrated. Referring more specifically to FIG. 2A, a first crossmember component 204A is coupled to a second crossmember component 204B via the second adapter plate apparatus 202. The first and second crossmember components 204A-B are the same as the first and second crossmember components 108A-B, respectively, illustrated in FIG. 1B except that instead of the recesses formed to accommodate the first adapter plate apparatus 102 and described and illustrated in more detail below with reference to FIG. 4, the first and second crossmember components 204A-B include first recesses 206A-B and second recesses 208A-B, respectively.

Each of the first recesses 206A-B and second recesses 208A-B can include machined faces formed in the top exterior surfaces of the first and second upper crossmember components 210A-B, respectively, and holes configured to accommodate bolts (e.g., M12 flange bolts). The holes in the first recesses 206A-B and second recesses 208A-B are aligned with corresponding holes in the second adapter plate apparatus 202, as described and illustrated below with reference to FIG. 2B. Optionally, similar recesses can be formed in the bottom exterior surface of the first and second lower crossmember components 124A-B in other examples.

Accordingly, the first and second crossmember components 204A-B are mirror images of each other in this particular example, although other configurations can also be used. When coupled, the second adapter plate apparatus 202 fits substantially within the recessed areas formed on both the front and rear sides of the second crossmember apparatus 200 by the first and second upper crossmember components 210A-B and first and second lower crossmember components 124A-B overhanging the first and second planar portions 126A-B as illustrated in, and explained in more detail above with reference to, FIG. 1B.

Referring more specifically to FIG. 2B, the second adapter plate apparatus 202 includes first and second adapter plate components 212A-B, respectively, which are mirror images of each other and configured to be coupled via aligned bolt holes to the first and second crossmember components 204A-B. The first and second adapter plate components 212A-B includes upper flanges 214A-B and lower flanges 216A-B, respectively. The upper flange 214A is configured to be coupled, via aligned bolt holes at the first recess 206A and second recess 208A, to the first and second upper crossmember components 210A-B, respectively. Similarly, the upper flange 214B is configured to be coupled, via aligned bolt holes at the first recess 206B and the second recess 208B, to the first and second upper crossmember components 210A-B, respectively.

In this particular example, the lower flanges 216A-B are also configured to be coupled via aligned bolt holes to the first and second lower crossmember components 124A-B. While the upper flanges 214A-B are substantially planar in this particular example, the lower flanges 216A-B have a curved shape that substantially corresponds with the shape of the portions of the first and second lower crossmember components 124A-B that intersect the first and second planar portions 126A-B, respectively.

The upper flange 214A and lower flange 216A are coupled together via an integral first planar component 218 and the upper flange 214B and lower flange 216B are also coupled together via an integral second planar component (not shown). In this particular example, the first planar component 218 has a length that extends beyond the upper flange 214A and lower flange 216A terminating at first and second tabs 220A-B. Similarly, the second planar component has a length that extends beyond the upper flange 214B and lower flange 216B terminating at a first tab (not shown) and a second tab 222.

Each of the first planar component 218, second planar component, first tab 220A of the first planar component 218, first tab of the second planar component, and second tabs 220B and 222 includes a set of two holes each configured to receive a bolt to couple those components and tabs of the second adapter plate apparatus 202 to the first and second crossmember components 204A-B. While in this example a length of the first planar component 218 and the second planar component is substantially equal to a combined length of the first and second planar portions 126A-B (illustrated in FIG. 1B) when the second adapter plate apparatus 202 is coupled to the first and second crossmember components 204A-B, other lengths and/or dimensions can also be used with corresponding impact to weight and ride stiffness, for example. Optionally, the second adapter plate apparatus 202 can be made of steel, although other materials can also be used.

Figure 3A:
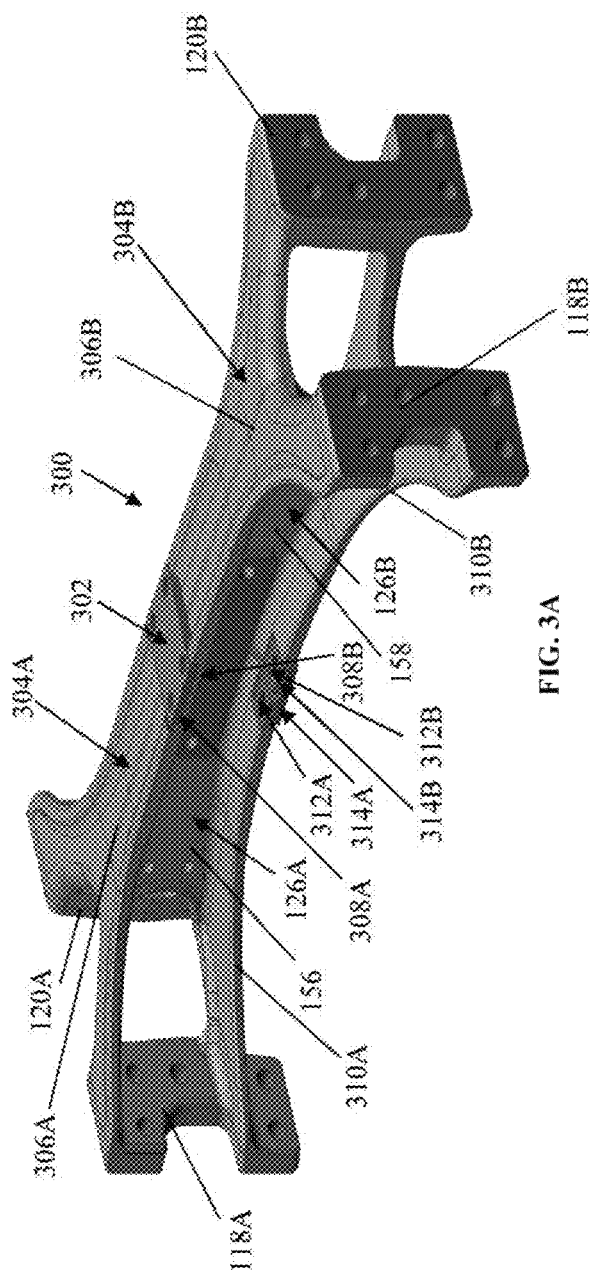
FIGS. 3A-B illustrate an exemplary third crossmember apparatus that employs an exemplary third adapter plate apparatus.
Figure 3B:
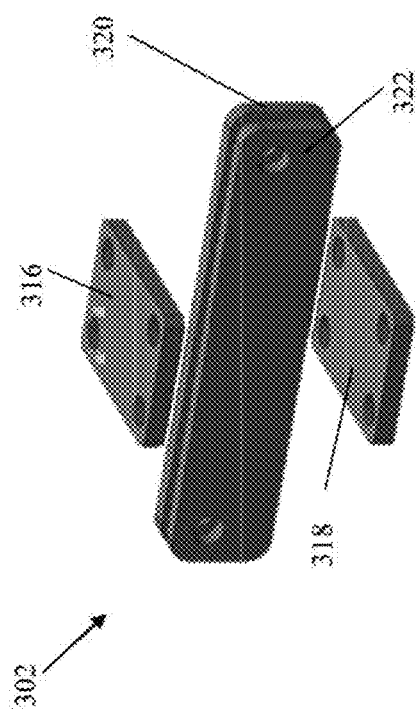

Referring to FIGS. 3A-B, an exemplary third crossmember apparatus 300 that employs a third adapter plate apparatus 302 according to some examples of this technology is illustrated. Referring more specifically to FIG. 3A, a first crossmember component 304A is coupled to a second crossmember component 304B via the third adapter plate apparatus 302. The first and second crossmember components 304A-B are the same as the first and second crossmember components 108A-B illustrated in FIG. 1B except that instead of the recesses formed to accommodate the first adapter plate apparatus 102, and described and illustrated in more detail below with reference to FIG. 4, the first and second upper crossmember components 306A-B includes first and second upper exterior recesses 308A-B, respectively, and the first and second lower crossmember components 310A-B include first and second lower interior recesses 312A-B and first and second lower exterior recesses 314A-B, respectively.

The first and second upper exterior recesses 308A-B, first and second lower interior recesses 312A-B, and first and second lower exterior recesses 314A-B can include machined faces formed in the top exterior surfaces of the first and second upper crossmember components 306A-B, top interior surface of the first and second lower crossmember components 310A-B, and bottom exterior surface of the first and second lower crossmember components 310A-B, respectively, and holes configured to accommodate bolts (e.g., M12 flange bolts). The holes in the first and second upper exterior recesses 308A-B, first and second lower interior recesses 312A-B, and first and second lower exterior recesses 314A-B are aligned with corresponding holes in the third adapter plate apparatus 302, as described and illustrated below with reference to FIG. 3B.

Optionally, recesses similar to the first and second lower interior recesses 312A-B can be formed in the bottom interior rear and/or front surface of the first and/or second upper crossmember components 306A-B in other examples. Additionally, recesses similar to the first and second lower interior recesses 312A-B can be formed in the top interior surface of the first and/or second lower crossmember components 310A-B. Accordingly, the first and second crossmember components 304A-B are mirror images of each other in this particular example, although other configurations can also be used.

Referring more specifically to FIG. 3B, the third adapter plate apparatus 302 includes a top plate 316, an opposing bottom plate 318, a front plate 320, and an opposing rear plate 322. The top plate 316 and bottom plate 318 are mirror images of each other, as are the front plate 320 and the rear plate 322 in this example, although other configurations can also be used in other examples. In this particular example, each of the top plate 316, bottom plate 318, front plate 320, and rear plate 322 has a substantially rectangular shape and optionally includes rounded corner(s) and/or edge(s), although other shapes and/or configurations can also be used.

The first and second upper exterior recesses 308A-B are configured to receive the top plate 316 and the first and second lower exterior recesses 314A-B are configured to receive the bottom plate 318. Additionally, the front plate 320 and the rear plate 322 are configured to fit within the recessed areas formed on both the front and rear sides of the third crossmember apparatus 300 by the first and second upper crossmember components 306A-B and first and second lower crossmember components 310A-B overhanging the first and second planar portions 126A-B. In particular, the rear plate 322 and the front plate 320 are configured to mount parallel to, and on rear and front sides respectively of, the first and second planar portions 126A-B.

For receiving bolts, the top plate 316 and the bottom plate 318 each includes a set of four holes disposed toward opposing corners and each of the front plate 320 and the rear plate 322 each includes a set of two holes disposed toward opposing ends. When coupled, two of the set of four holes of each of the top plate 316 and the bottom plate 318 are aligned with two holes in each of the first and second upper exterior recesses 308A-B and the first and second lower exterior recesses 314A-B, respectively, such that the top plate 316 and the bottom plate 318 span the first and second upper crossmember components 306A-B and first and second lower crossmember components 310A-B, respectively. Additionally, when coupled, one of the set of two holes of each of the front plate 320 and the rear plate 322 is aligned with a hole in each of the first planar portion 126A and the second planar portion 126B such that the front plate 320 and the rear plate 322 span front and rear sides of the first and second planar portions 126A-B, respectively.

In this particular example, the front plate 320 and the rear plate 322 are longer in the direction transverse to the long axis of the first and second chassis rails 104A-B, and parallel to a long axis of the first and second planar portions 126A-B. Additionally, the top plate 316 and the bottom plate 318 in this example have a length, in the direction parallel to the long axis of the first and second chassis rails 104A-B, that is substantially equivalent to a width in that direction of the first and second upper crossmember components 306A-B and first and second lower crossmember components 310A-B, respectively. Other lengths, widths, and/or shapes for one or more of the top plate 316, bottom plate 318, front plate 320, and/or bottom plate 318 can also be used in other examples with a corresponding impact to weight and ride stiffness, for example. Optionally, the third adapter plate apparatus 302 can be made of steel, although other materials can also be used.

Figure 4:
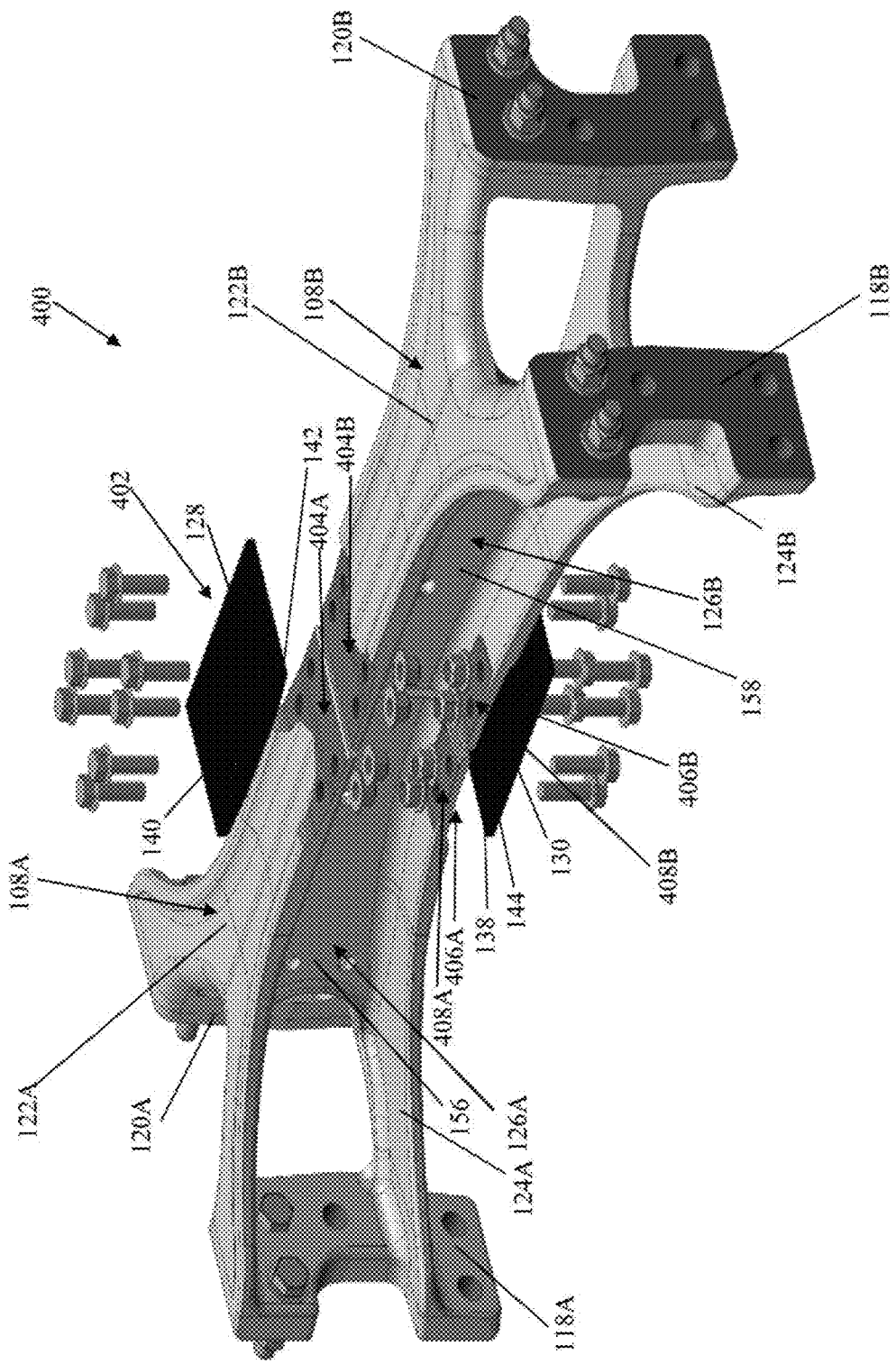
FIG. 4 illustrates an exemplary fourth crossmember apparatus that employs an exemplary fourth adapter plate apparatus.

Referring to FIG. 4, an exemplary fourth crossmember apparatus 400 that employs a fourth adapter plate apparatus 402 according to some examples of this technology is illustrated. In this example, the fourth adapter plate apparatus 402 includes the upper adapter plate component 128 and the lower adapter plate component 130 of the first adapter plate apparatus 102 but separated and without the integral bridge component 132.

The interior surface (not shown) of the upper adapter plate component 128 and the opposing interior surface 138 of the lower adapter plate component 130 are curved or convex such that the upper and lower adapter plate components 128 and 130, respectively, have decreasing thickness in an outward direction when the fourth adapter plate apparatus 402 and first and second crossmember components 108A-B are coupled together. The first and second upper crossmember components 122A-B include machined upper exterior recesses 404A-B, respectively, that are shaped to substantially correspond with the curved or convex surface shape or contour of the interior surface of the upper adapter plate component 128. The first and second upper exterior recesses 404A-B also include holes disposed to align with the four sets of offset holes in the upper adapter plate component 128 described in more detail above with reference to FIG. 1C.

Similarly, the first and second lower crossmember components 124A-B include machined lower exterior recesses 406A-B, respectively, that are shaped to substantially correspond with the curved or convex surface shape or contour of the interior surface 138 of the lower adapter plate component 130. The first and second lower exterior recesses 406A-B also include holes disposed to align with the four sets of offset holes in the lower adapter plate component 130 described in more detail above with reference to FIG. 1C. In this particular example, the first and second lower crossmember components 124A-B include machined lower interior recesses 408A-B, respectively, each of which includes one set of two offset holes disposed to align with the two rear-most sets of offset holes of the lower adapter plate component 130.

The first and second lower interior recesses 408A-B can receive nuts to which bolts (e.g., M12 flange bolts) are threaded through the offset holes when the fourth adapter plate apparatus 402 is coupled to the first and second crossmember components 108A-B. Optionally, corresponding interior recesses (not shown) can be provided on the front of the first and/or second lower crossmember components 124A-B and/or the front and/or rear of the first and/or second upper crossmember components 122A-B.

Additionally, as explained in more detail above, first attachment plates 118A-B and second attachment plates 120A-B each include five holes in this example for receiving bolts (e.g., M12 flange bolts). Each of the holes of the first attachment plates 118A-B and second attachment plates 120A-B are configured to align with a corresponding hole in one of the first or second chassis rails 104A-B to facilitate coupling of the first and second crossmember components 108A-B to the first and second chassis rails 104A-B, respectively, via the bolts disposed through the holes and the nuts threaded thereto. While a pair of upper bolts and attached nuts are illustrated in FIG. 4 coupled to each of the first attachment plates 118A-B and the second attachment plates 120A-B, bolts and attached nuts can be inserted into each of the five holes in each of the first attachment plates 118A-B and the second attachment plates 120A-B, and other numbers of holes for one or more of the first attachment plates 118A-B or the second attachment plates 120A-B can also be used in other examples.

As described and illustrated by way of the examples herein, the exemplary adapter plate apparatuses of this technology allow for more efficient replacement of failed chassis crossmembers that does not require separating the chassis rails and associated disassembly of vehicle components mounted thereto. With this technology, failed crossmembers can be replaced with reduced labor and in a reduced amount of time without adding significant weight, while maintaining sufficient structural support, and with minimal impact to ride and suspension stiffness.

The above description and corresponding illustrations provide an adaptor plate apparatus. In embodiments, the adaptor plate apparatus comprises an upper adapter plate component comprising a first substantially planar exterior surface, a first substantially convex interior surface, and a first set of holes; a lower adapter plate component comprising a second substantially planar exterior surface, a first substantially convex interior surface, and a second set of holes; and wherein each hole of the first set of holes is located so as to be aligned with one of the second set of holes when the upper and lower adapter plate components are received by first and second crossmember components of a vehicle chassis crossmember apparatus, respectively.

In a first example of the adaptor plate apparatus, each hole of the first set of holes is located so as to be aligned with a corresponding hole in one of a first or second upper exterior recess of the first or second crossmember component, respectively, when the upper adapter plate component is received by the first and second upper exterior recesses of the first and second crossmember components, respectively.

A second example of the adaptor plate apparatus optionally includes the first example, and includes wherein the first and second upper exterior recesses are formed in first and second upper crossmember components of the first and second crossmember components, respectively.

A third example of the adaptor plate apparatus optionally includes any one or more or each of the first through second examples, and includes wherein each hole of the second set of holes is located so as to be aligned with a corresponding hole in one of a first or second lower exterior recess of the first or second crossmember component, respectively, when the lower adapter plate component is received by the first and second lower exterior recesses of the first and second crossmember components, respectively.

A fourth example of the adaptor plate apparatus optionally includes any one or more or each of the first through third examples, and includes wherein the first and second lower exterior recesses are formed in first and second lower crossmember components of the first and second crossmember components, respectively.

A fifth example of the adaptor plate apparatus optionally includes any one or more or each of the first through fourth examples, and includes wherein each of the first and second sets of four holes is configured to receive a fastener to thereby couple the upper and lower adapter plate components to the first and second crossmember components.

A sixth example of the adaptor plate apparatus optionally includes any one or more or each of the first through fourth examples, and includes wherein the first set of holes comprises a first set of four pairs of holes, the second set of holes comprises a second set of four pairs of holes, each pair of the first set of four pairs of holes comprises two offset holes, and each pair of the second set of four pairs of holes comprises two offset holes.

A seventh example of the adaptor plate apparatus optionally includes any one or more or each of the first through sixth examples, and includes wherein a first one of the two offset holes of each of the first and second sets of four pairs of holes is located toward a front of a rear of the upper or lower adapter plate apparatus, respectively, as compared to a second one of the two offset holes of each of the first and second sets of four pairs of holes.

In an eighth example of the adapter plate apparatus the upper and lower adapter plate components are coupled together via a bridge component such that the upper and lower plate components and the bridge component collectively form a unitary structure.

The above description and corresponding illustrations also provide a vehicle chassis crossmember apparatus. In embodiments, the vehicle chassis crossmember apparatus comprises a first crossmember component comprising a first planar portion, a first upper crossmember component, a first lower crossmember component coupled to the first upper crossmember component via the first planar portion, and a first exterior recess; a second crossmember component comprising a second planar portion, a second upper crossmember component, a second lower crossmember component coupled to the second upper crossmember component via the second planar portion, and a second exterior recess; and an upper adapter plate component and a lower adapter plate component configured to be received by and coupled to the first and second exterior recesses, to thereby couple the first crossmember component to the second crossmember component.

In a first example of the vehicle chassis crossmember apparatus the first upper crossmember component comprises a first upper exterior recess, the first lower crossmember component comprises a first lower exterior recess, the second upper crossmember component comprises a second upper exterior recess, the second lower crossmember component comprises a second lower exterior recess, and the upper and lower adapter plate components are configured to be received by and coupled to the first and second upper exterior recesses and the first and second lower exterior recesses.

A second example of the vehicle chassis crossmember apparatus optionally includes the first example, and includes wherein each of the upper and lower adapter plate components comprises a substantially convex interior surface and a substantially planar exterior surface.

A third example of the vehicle chassis crossmember apparatus optionally includes any one or more or each of the first through second examples, and includes wherein the first and second upper exterior recesses collectively have a substantially concave exterior surface; and the first and second lower exterior recesses collectively have a substantially concave exterior surface.

A fourth example of the vehicle crossmember apparatus optionally includes any one or more or each of the first through third examples, and includes wherein the upper adapter plate component comprises a first set of four pairs of holes, wherein each pair of the first set of four pairs of holes comprises two offset holes; and the lower adapter plate component comprises a second set of four pairs of holes, wherein each pair of the second set of four pairs of holes comprises two offset holes.

A fifth example of the vehicle crossmember apparatus optionally includes any one or more or each of the first through fourth examples, and includes wherein each hole of the first set of four pairs of holes is located so as to be aligned with a corresponding hole in one of the first or second upper exterior recess, respectively, when the upper adapter plate component is received by the first and second upper exterior recesses, respectively.

A sixth example of the vehicle chassis crossmember apparatus optionally includes any one or more or each of the first through fifth examples, and includes wherein each hole of the second set of four pairs of holes is located so as to be aligned with a corresponding hole in one of the first or second lower exterior recess, respectively, when the lower adapter plate component is received by the first and second lower exterior recesses, respectively.

A seventh example of the vehicle chassis crossmember apparatus optionally includes any one or more or each of the first through sixth examples, and includes wherein each of the first and second sets of four pairs of offset holes is configured to receive a fastener to thereby couple the upper and lower adapter plate components to the first and second crossmember components.

An eighth example of the vehicle chassis crossmember apparatus optionally includes any one or more or each of the first through seventh examples, and includes wherein a first one of the two offset holes of each of the first and second sets of four pairs of holes is located toward a front of a rear of the upper or lower adapter plate apparatus, respectively, as compared to a second one of the two offset holes of each of the first and second sets of four pairs of holes.

A ninth example of the vehicle chassis crossmember apparatus optionally includes any one or more or each of the first through eighth examples, and includes wherein the first crossmember component comprises a first one or more attachment plates configured to be coupled to a first chassis rail between a first set of upper and lower flanges of the first chassis rail; and the second crossmember component comprises a second one or more attachment plates configured to be coupled to a second chassis rail between a second set of upper and lower flanges of the second chassis rail, wherein the second chassis rail is disposed opposite of and substantially parallel to the first chassis rail.

The above description and corresponding illustrations also provide a method for installing a vehicle chassis crossmember. In embodiments, the method comprises coupling a first set of attachment plates of a first crossmember component of a vehicle chassis crossmember apparatus to a first chassis rail between first upper and lower flanges of the first chassis rail; coupling a second set of attachment plates of a second crossmember component of the vehicle chassis crossmember apparatus to a second chassis rail between second upper and lower flanges of the second chassis rail; coupling an upper adapter plate component of the vehicle chassis crossmember apparatus to first and second upper exterior recesses of the first and second crossmember components; and coupling a lower adapter plate component of the vehicle chassis crossmember apparatus to first and second lower exterior recesses of the first and second crossmember components.

In a first example of the method, the method further comprises coupling the first set of attachment plates of the first crossmember component of the vehicle chassis crossmember apparatus to a first interior planar surface of the first chassis rail; and coupling the second set of attachment plates of the second crossmember component of the vehicle chassis crossmember apparatus to a second interior planar surface of the second chassis rail, wherein the second chassis rail is disposed opposite of and substantially parallel to the first chassis rail.

A second example of the method optionally includes the first example, and includes wherein the upper and lower adapter plate components span the first and second crossmember components and thereby couple the first crossmember component to the second crossmember component.

A third example of the method optionally includes any one or more of the first through second examples, and includes inserting a fastener into each hole of a set of four pairs of offset holes in the upper adapter plate component, a first set of two pairs of offset holes in the first upper exterior recess, and a second set of two pairs of offset holes in the second upper exterior recess in order to couple the upper adapter plate component to the first and second upper exterior recesses, wherein each hole of the first and second sets of two pairs of offset holes is aligned with one hole of the set of four pairs of offset holes.

A fourth example of the method optionally includes any one or more or each of the first through third examples, and includes inserting a fastener into each hole of a set of four pairs of offset holes in the lower adapter plate component, a first set of two pairs of offset holes in the first lower exterior recess, and a second set of two pairs of offset holes in the second lower exterior recess in order to couple the lower adapter plate component to the first and second lower exterior recesses, wherein each hole of the first and second sets of two pairs of offset holes is aligned with one hole of the set of four pairs of offset holes.

A fifth example of the method optionally includes any one or more or each of the first through fourth examples, and includes wherein the first and second fasteners comprise flange bolts and the method further comprises threading a nut onto each of the first and second fasteners to retain the first and second fasteners in place.

The above description and corresponding illustrations provide another adaptor plate apparatus. In embodiments, the adaptor plate apparatus comprises first and second adapter plate components configured to be coupled together on opposing sides of first and second crossmember components via respective holes aligned with other holes in the first and second crossmember components to thereby retain the first and second crossmember components in place; wherein each of the first and second adapter plate components comprises an upper flange and a lower flange coupled together via a planar component and configured to be disposed proximate first and second recesses of the first and second crossmember components.

In a first example of the adaptor plate apparatus, each of the planar components has a length that extends beyond the upper and lower flanges terminating at opposing first and second tabs each with one or more holes.

In a second example of the adaptor plate apparatus, each of the upper flanges is substantially planar and each of the lower flanges has a concave shape that substantially corresponds with a convex lower portion of one of the first or second crossmember components.

The above description and corresponding illustrations also provide another vehicle chassis crossmember apparatus. In embodiments, the vehicle chassis crossmember apparatus comprises a first crossmember component comprising a first planar portion, a first upper crossmember component comprising a first upper exterior recess, and a first lower crossmember component coupled to the first upper crossmember component via the first planar portion and comprising a first lower exterior recess; a second crossmember component comprising a second planar portion, a second upper crossmember component comprising a second upper exterior recess, and a second lower crossmember component coupled to the second upper crossmember component via the second planar portion and comprising a second lower exterior recess; a top plate configured to be received by the first and second upper exterior recesses to be coupled to the first and second upper crossmember components; a bottom plate configured to be received by the first and second lower exterior recesses and to be coupled to the first and second lower crossmember components; and first and rear plates configured mount parallel to rear and front sides of the first and second planar portions, respectively.

In a first example of the adaptor plate apparatus, each of the top, bottom, front, and rear plates has a substantially rectangular shape.

In a second example of the adaptor plate apparatus, the top plate and the bottom plate span the first and second upper crossmember components and the first and second lower crossmember components, respectively, and the front plate and the rear plate span front and rear sides of the first and second planar portions, respectively.

In a third example of the adaptor plate apparatus, the front plate and the rear plate are longer in a direction transverse to the long axis of first and second chassis rails to which the first and second crossmember components are configured to attach, and parallel to another long axis of the first and second planar portions.

In a fourth example of the adaptor plate apparatus, the top plate and the bottom plate have a length, in a direction parallel to a long axis of first and second chassis rails 104A-B to which the first and second crossmember components are configured to attach, that is substantially equivalent to a width in that direction of the first and second upper crossmember components and first and second lower crossmember components, respectively.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. An adapter plate apparatus, comprising:
   an upper adapter plate component comprising a first substantially planar exterior surface, a first substantially convex interior surface extending along a longitudinal axis of the upper adapter plate component, and a first set of holes extending parallel to the longitudinal axis of the upper adapter plate component;
   a lower adapter plate component comprising a second substantially planar exterior surface, a first substantially convex interior surface extending along a longitudinal axis of the lower adapter plate component, and a second set of holes extending parallel to the longitudinal axis of the lower adapter plate component; and
   wherein each hole of the first set of holes is located so as to be aligned with one of the second set of holes when the upper and lower adapter plate components are received by first and second crossmember components of a vehicle chassis crossmember apparatus, respectively.

2. The adapter plate apparatus of claim 1, wherein each hole of the first set of holes is located so as to be aligned with a corresponding hole in one of a first or second upper exterior recess of the first or second crossmember component, respectively, when the upper adapter plate component is received by the first and second upper exterior recesses of the first and second crossmember components, respectively.

3. The adapter plate apparatus of claim 2, wherein the first and second upper exterior recesses are formed in first and second upper crossmember components of the first and second crossmember components, respectively.

4. The adapter plate apparatus of claim 1, wherein each hole of the second set of holes is located so as to be aligned with a corresponding hole in one of a first or second lower exterior recess of the first or second crossmember component, respectively, when the lower adapter plate component is received by the first and second lower exterior recesses of the first and second crossmember components, respectively.

5. The adapter plate apparatus of claim 4, wherein the first and second lower exterior recesses are formed in first and second lower crossmember components of the first and second crossmember components, respectively.

6. The adapter plate apparatus of claim 1, wherein each of the first and second sets of four holes is configured to receive a fastener to thereby couple the upper and lower adapter plate components to the first and second crossmember components.

7. The adapter plate apparatus of claim 1, wherein the first set of holes comprises a first set of four pairs of holes, the second set of holes comprises a second set of four pairs of holes, each pair of the first set of four pairs of holes comprises two offset holes, and each pair of the second set of four pairs of holes comprises two offset holes.

8. The adapter plate apparatus of claim 7, wherein a first one of the two offset holes of each of the first and second sets of four pairs of holes is located toward a front of a rear of the upper or lower adapter plate apparatus, respectively, as compared to a second one of the two offset holes of each of the first and second sets of four pairs of holes.

9. The adapter plate apparatus of claim 1, wherein the first substantially convex interior surface extending along the longitudinal axis of the upper adapter plate and the second substantially convex interior surface extending along the longitudinal axis of the lower adapter plate each have a first thickness at each end of the longitudinal axis, and wherein each have a second thickness larger than the first thickness at a point along the longitudinal axis between each end.

10. A vehicle chassis crossmember apparatus, comprising:
   a first crossmember component comprising a first planar portion, a first upper crossmember component, a first lower crossmember component coupled to the first upper crossmember component via the first planar portion, and a first exterior recess;
   a second crossmember component comprising a second planar portion, a second upper crossmember component, a second lower crossmember component coupled to the second upper crossmember component via the second planar portion, and a second exterior recess; and
   an upper adapter plate component and a lower adapter plate component configured to be received by and coupled to the first and second exterior recesses, to thereby couple the first crossmember component to the second crossmember component;

wherein each of the upper and lower adapter plate components comprises a substantially convex interior surface and a substantially planar exterior surface extending along a longitudinal axis of the respective upper and lower adapter plate components; and wherein the upper adapter plate component further includes a first set of holes extending parallel to the longitudinal axis of the upper adapter plate component, and the lower adapter plate component further includes a second set of holes extending parallel to the longitudinal axis of the lower adapter plate component.

11. The vehicle chassis crossmember apparatus of claim 10, wherein the first upper crossmember component comprises a first upper exterior recess, the first lower crossmember component comprises a first lower exterior recess, the second upper crossmember component comprises a second upper exterior recess, the second lower crossmember component comprises a second lower exterior recess, and the upper and lower adapter plate components are configured to be received by and coupled to the first and second upper exterior recesses and the first and second lower exterior recesses.

12. The vehicle chassis crossmember apparatus of claim 11, wherein:
the first and second upper exterior recesses collectively have a substantially concave exterior surface; and
the first and second lower exterior recesses collectively have a substantially concave exterior surface.

13. The vehicle chassis crossmember apparatus of claim 11, wherein:
the first set of holes comprises two offset holes; and
the second set of holes comprises two offset holes.

14. The vehicle chassis crossmember apparatus of claim 11, wherein each hole of the first set of holes is located so as to be aligned with a corresponding hole in one of the first or second upper exterior recess, respectively, when the upper adapter plate component is received by the first and second upper exterior recesses, respectively.

15. The vehicle chassis crossmember apparatus of claim 11, wherein each hole of the second set of holes is located so as to be aligned with a corresponding hole in one of the first or second lower exterior recess, respectively, when the lower adapter plate component is received by the first and second lower exterior recesses, respectively.

16. The vehicle chassis crossmember apparatus of claim 11, wherein each of the first and second sets of holes is configured to receive a fastener to thereby couple the upper and lower adapter plate components to the first and second crossmember components.

17. The vehicle chassis crossmember apparatus of claim 11, wherein a first pair of holes of each of the first and second sets of holes is located toward a front of a rear of the upper or lower adapter plate component, respectively, and opposite to a second pair of holes of each of the first and second sets of holes.

18. The vehicle chassis crossmember apparatus of claim 10, wherein:
the first crossmember component comprises a first one or more attachment plates configured to be coupled to a first chassis rail between a first set of upper and lower flanges of the first chassis rail; and
the second crossmember component comprises a second one or more attachment plates configured to be coupled to a second chassis rail between a second set of upper and lower flanges of the second chassis rail, wherein the second chassis rail is disposed opposite of and substantially parallel to the first chassis rail.

19. A method for installing a vehicle chassis crossmember, the method comprising:
coupling a first set of attachment plates of a first crossmember component of a vehicle chassis crossmember apparatus to a first chassis rail between first upper and lower flanges of the first chassis rail;
coupling a second set of attachment plates of a second crossmember component of the vehicle chassis crossmember apparatus to a second chassis rail between second upper and lower flanges of the second chassis rail;
coupling an upper adapter plate component of the vehicle chassis crossmember apparatus to first and second upper exterior recesses of the first and second crossmember components; and
coupling a lower adapter plate component of the vehicle chassis crossmember apparatus to first and second lower exterior recesses of the first and second crossmember components;
wherein each of the upper and lower adapter plate components comprises a substantially convex interior surface and a substantially planar exterior surface extending along a longitudinal axis of the respective upper and lower adapter plate components; and
wherein the upper adapter plate component further includes a first set of holes extending parallel to the longitudinal axis of the upper adapter plate component, and the lower adapter plate component further includes a second set of holes extending parallel to the longitudinal axis of the lower adapter plate component.

20. The method of claim 19, further comprising:
coupling the first set of attachment plates of the first crossmember component of the vehicle chassis crossmember apparatus to a first interior planar surface of the first chassis rail; and
coupling the second set of attachment plates of the second crossmember component of the vehicle chassis crossmember apparatus to a second interior planar surface of the second chassis rail, wherein the second chassis rail is disposed opposite of and substantially parallel to the first chassis rail.

21. The method of claim 19, wherein the upper and lower adapter plate components span the first and second crossmember components and thereby couple the first crossmember component to the second crossmember component.

22. The method of claim 19, further comprising inserting a fastener into each hole of the first set of holes in the upper adapter plate component, a first set of holes in the first upper exterior recess, and a second set of holes in the second upper exterior recess in order to couple the upper adapter plate component to the first and second upper exterior recesses, wherein each hole of the first and second sets of holes in the first and second upper exterior recesses is aligned with one hole of the set of holes in the upper adapter plate component.

23. The method of claim 19, inserting a fastener into each hole of the second set of holes in the lower adapter plate component, a first set of holes in the first lower exterior recess, and a second set of holes in the second lower exterior recess in order to couple the lower adapter plate component to the first and second lower exterior recesses, wherein each hole of the first and second sets of holes in the first and second lower exterior recesses is aligned with one hole of the set of holes in the lower adapter plate component.

24. The method of claim 23, wherein the first and second fasteners comprise flange bolts and the method further comprises threading a nut onto each of the first and second fasteners to retain the first and second fasteners in place.

\* \* \* \* \*